(12) United States Patent
Heinrich et al.

(10) Patent No.: US 11,468,319 B2
(45) Date of Patent: Oct. 11, 2022

(54) METHOD AND SYSTEM FOR PREDICTING SENSOR SIGNALS FROM A VEHICLE

(71) Applicant: Conti Temic microelectronic GmbH, Nuremberg (DE)

(72) Inventors: Stefan Heinrich, Achern (DE); Elias Strigel, Wangen (DE); Martin Pfitzer, Bodolz (DE); Jan Giebel, Sigmarszell (DE)

(73) Assignee: CONTI TEMIC MICROELECTRONIC GMBH, Nuremberg (DE)

( * ) Notice: Subject to any disclaimer, the term of this patent is extended or adjusted under 35 U.S.C. 154(b) by 588 days.

(21) Appl. No.: 16/498,617

(22) PCT Filed: Mar. 26, 2018

(86) PCT No.: PCT/DE2018/200029
§ 371 (c)(1),
(2) Date: Sep. 27, 2019

(87) PCT Pub. No.: WO2018/177484
PCT Pub. Date: Oct. 4, 2018

(65) Prior Publication Data
US 2021/0064980 A1 Mar. 4, 2021

(30) Foreign Application Priority Data
Mar. 27, 2017 (DE) .................. 10 2017 205 093.4

(51) Int. Cl.
*G06N 3/08* (2006.01)
*G06K 9/62* (2022.01)
(Continued)

(52) U.S. Cl.
CPC ............. *G06N 3/08* (2013.01); *G06K 9/6262* (2013.01); *G06V 10/751* (2022.01); *G06V 20/56* (2022.01)

(58) Field of Classification Search
CPC combination set(s) only.
See application file for complete search history.

(56) References Cited

U.S. PATENT DOCUMENTS 6,473,746 B1 10/2002 Zakrzewski
7,956,898 B2 * 6/2011 Chen ...................... H04N 19/52
348/208.6
(Continued)

FOREIGN PATENT DOCUMENTS

EP 0 615 892 9/1994
EP 3 085 937 10/2016

OTHER PUBLICATIONS

English translation of the International Search Report of the International Searching Authority for International Application PCT/DE2018/200029, dated Jul. 4, 2018, 3 pages, European Patent Office, HV Rijswijk, Netherlands.

(Continued)

*Primary Examiner* — Cindy Trandai
(74) *Attorney, Agent, or Firm* — RatnerPrestia

(57) ABSTRACT

A method of ascertaining disparities in sensor data uses at least one neural network implemented in a controller of a vehicle. The method involves capturing (101) a learning data record from temporally successive raw sensor data, evaluating (102) the learning data record to train the neural network exclusively based on the learning data record of the captured raw sensor data, ascertaining (103) expected sensor data, comparing (104) the ascertained expected sensor data with sensor data currently captured by the sensor arrangement, and ascertaining (105) a disparity between the cur- (Continued)

rently captured sensor data and the ascertained expected sensor data.

15 Claims, 2 Drawing Sheets

(51) Int. Cl.
*G06V 10/75* (2022.01)
*G06V 20/56* (2022.01)

(56) References Cited

U.S. PATENT DOCUMENTS

| | | | |
|---|---|---|---|
| 8,428,828 | B2 | 4/2013 | Serban et al. |
| 8,484,225 | B1* | 7/2013 | Datta .................. G06N 5/02 707/752 |
| 9,221,396 | B1 | 12/2015 | Zhu et al. |
| 11,049,321 | B2* | 6/2021 | Lu Hill ................ G06T 7/246 |
| 2005/0010445 | A1* | 1/2005 | Krishnan .............. G16H 50/20 706/45 |
| 2011/0293180 | A1* | 12/2011 | Criminisi ................ G06T 7/11 348/46 |
| 2016/0048216 | A1* | 2/2016 | Fink .................. H04N 5/23277 345/156 |
| 2016/0057446 | A1* | 2/2016 | Tusch .................. G06T 3/40 375/240.08 |
| 2016/0092734 | A1* | 3/2016 | Loce .................. G06V 20/593 382/103 |
| 2017/0032242 | A1 | 2/2017 | Corrado et al. |
| 2017/0084038 | A1* | 3/2017 | Dane .................. G06T 7/20 |
| 2017/0161591 | A1* | 6/2017 | English .............. G06V 10/454 |
| 2017/0193337 | A1* | 7/2017 | Kriegman ........... G06V 10/758 |
| 2018/0068206 | A1* | 3/2018 | Pollach .............. G06K 9/6289 |
| 2018/0099646 | A1* | 4/2018 | Karandikar .......... B60W 40/02 |
| 2018/0120843 | A1* | 5/2018 | Berntorp .............. G06V 20/56 |
| 2018/0136332 | A1* | 5/2018 | Barfield, Jr. .......... G01S 7/4802 |
| 2020/0394515 | A1* | 12/2020 | Koike .................. G06K 9/6271 |

OTHER PUBLICATIONS

PCT International Preliminary Report on Patentability including English Translation of PCT Written Opinion of the International Searching Authority for International Application PCT/DE2018/200029, dated Oct. 1, 2019, 8 pages, International Bureau of WIPO, Geneva, Switzerland.

German Search Report for German Patent Application No. 10 2017 205 093.4, dated Feb. 27, 2018, 8 pages, German Patent and Trademark Office, Muenchen, Germany, with partial English translation, 6 pages.

Mona Ibrahim et al., "Nonlinear Autoregressive Neural Network in an Energy Management Strategy for Battery/Ultra-Capacitor Hybrid Electrical Vehicles", Electric Power Systems Research, Amsterdam, NL, vol. 136, Jul. 1, 2016, DOI: 10.1016/j.epsr.2016.03.005, XP055487048, ISSN: 0378-7796, pp. 262 to 269.

Marc R. Ward et al., "Vibrometry-Based Vehicle Identification Framework Using Nonlinear Autoregressive Neural Networks and Decision Fusion", NAECON 2014—IEEE National Aerospace and Electronics Conference, Jun. 24, 2014, DOI: 10.1109/NAECON.2014.7045799, XP032737851, pp. 180-185.

Yasuhisa Hayakawa et al. , "All Round Blind Spot Detection by Lens Condition Adaptation Based on Rearview Camera Images", SAE 2013 World Congress & Exhibition, Society of Automotive Engineers, Warrendale, PA, US, No. Paper 2013-01-0622, Apr. 8, 2013, DOI: 10.4271/2013-01-0622, XP008171970, pp. 1 to 7.

Marius Cordts et al., "The Cityscapes Dataset for Semantic Urban Scene Understanding", Proceedings of the IEEE Computer Society Conference on Computer Vision and Pattern Recognition (CVPR 2016), Las Vegas, Nevada, Jun. 26, 2016, pp. 3213 to 3223.

\* cited by examiner

METHOD AND SYSTEM FOR PREDICTING SENSOR SIGNALS FROM A VEHICLE

FIELD OF THE INVENTION

The invention relates to a method for ascertaining disparities in sensor data using a neural network implemented in a controller of a vehicle. In addition, the invention relates to a driver assistance system.

Pixel-based classification systems on the basis of so-called "deep neural networks" are deployed for the video-based recognition and/or segmenting of objects in a vehicle environment. In order to train such classification systems, enormous quantities of learning data are as a general rule required, which are initially manually evaluated in order to produce specified nominal values for the pixel-based classification systems and/or for algorithms implemented therein. Recognizable objects in the image data can, for example, be manually divided into classes, wherein nominal values can in turn be assigned to the respective classes. This manual learning step for training a neural network is also known as "labeling". Therefore, a considerable deployment of human resources can be required for training a neural network.

SUMMARY OF THE INVENTION

It is an object of the present invention to provide a method which makes possible automated training of the neural network.

The above object can be achieved by at least one embodiment of a method and of a driver assistance system, according to the invention, having the features set forth herein.

A first aspect of the invention relates to a method for ascertaining disparities in sensor data based on and/or using at least one neural network implemented in a controller of a vehicle. The method according to the invention can refer to a method for predicting sensor data of a sensor arrangement, so to speak. The method involves the following steps:

capturing, with a sensor arrangement of the vehicle, a learning data record of temporally successive raw sensor data;

evaluating, using the neural network implemented in the controller of the vehicle, the learning data record to train the neural network based on the learning data record of captured raw sensor data, in particular exclusively based on the learning data record of captured raw sensor data;

ascertaining and/or predicting expected sensor data;

comparing the expected sensor data ascertained and/or predicted using the neural network with sensor data currently captured by the sensor arrangement; and ascertaining, with the controller, a disparity between the currently captured sensor data and the expected sensor data ascertained with the trained neural network, in particular ascertaining a disparity by subtracting the expected and currently captured sensor data.

The object is achieved by the features of the independent claims. Advantageous further developments of the invention are set out by the dependent claims and the following description.

It is therefore envisaged according to the invention that the at least one neural network implemented in the controller of the vehicle be trained based on the raw sensor data, in particular exclusively based on the raw sensor data, of the sensor arrangement such that a manual training of the neural network can be dispensed with.

A temporal succession of raw sensor data can be used for the actual training of the neural network implemented in the controller and/or of an algorithm implemented in the controller in order to recognize disparities in sensor data of the sensor arrangement. This temporal succession of raw sensor data can refer to the "learning data record". The "raw sensor data" can additionally refer to sensor data which are fed in an unprocessed manner and/or without intermediate processing, in particular without manual processing of the data, for example without a "labeling" of the data, to the neural network, and are evaluated by said neural network. A "disparity" within the meaning of the invention can refer to an anomaly and/or an irregularity between the sensor data actually captured and the sensor data ascertained and/or predicted using the trained neural network.

At the start of the training of the neural network, the learning data record is captured according to the invention with the sensor arrangement and/or with a sensor element of the sensor arrangement. As explained above, the learning data record can contain temporally successive raw sensor data such as, for instance, image data, radar data, laser data and/or other vehicle data. The raw sensor data can, for example, be ascertained and/or captured in a series of discrete times (t1, t2, t3, . . . , tn). Based on the learning data record, the controller and/or the neural network implemented therein can make a prediction for temporally successive sensor data and/or sensor data to be expected. During the training phase of the method, said predicted expected sensor data can then be matched and/or compared with temporally corresponding sensor data which have actually been captured. Such a matching can also be performed a number of times and/or repeatedly until the expected sensor data correspond to the actually captured sensor data sufficiently precisely. In other words, a learning data record from temporally previous raw sensor data with the times t1, t2, t3, . . . , tn can be utilized as the input data record for the teaching of the neural network regarding a sensor data record of currently captured sensor data, such as e.g. an image data record at a time t0. A learning step can be performed for the neural network with the learning data record (t1, t2, t3, . . . , tn) and the sensor data predicted at time t0 such that, during a later application of an input data record to the taught neural network, the current sensor data actually ascertained with the sensor arrangement can correspond sufficiently precisely to the predicted sensor data. In other words, the trained or respectively taught neural network can prepare a prediction for sensor data to be captured in future, i.e. expected, by being supplied with the input data record from temporally previously captured sensor data. The expected sensor data can subsequently be compared with the sensor data which are actually captured at the respective time. This means expected sensor data for the time t0 can be compared with the sensor data captured at time t0. The comparison can in particular be effected by subtracting the expected and the captured sensor data. On the basis of this comparison of the captured and expected sensor data, disparities between said sensor data can thus be ascertained and/or determined. In order to ascertain such disparities, specific thresholds can also be set, i.e. a disparity can be ascertained, for instance, if a certain threshold is reached. On the other hand, it can be assumed that there is a sufficient correspondence between the expected and the captured sensor data if the threshold is not reached. Ascertained disparities between currently captured sensor data and predicted sensor data can then be assigned to specific events such as e.g. a pedestrian, a moving object, another vehicle and/or a static object.

In summary, the neural network implemented in the controller can be trained completely according to the invention based on the sensor data captured with the sensor arrangement. This means that it is not necessary for the neural network or respectively features in the sensor data to be manually trained. The labeling of the sensor data in order to train the neural network can consequently be dispensed with. In addition, the disparities can be segmented on the basis of a prediction error between the sensor data actually captured and the ascertained/predicted sensor data.

The method described above and below can be applied to a plurality of vehicle sensors, e.g. to surround view systems, during a deployment of radar, lidar, ultrasonic and/or laser sensors and/or also other vehicle sensors such as, for example, rotation rate sensors, vehicle speed sensors and/or a combination of the aforementioned sensors.

The invention is described below with reference to an exemplary neural network, however multiple neural networks can also be deployed in parallel or serially according to the invention, in order to ascertain an expected value for upcoming sensor data from the captured sensor data. For example, a separate neural network can be deployed for each feature of the sensor data, in order to predict the respective feature for the upcoming sensor data or respectively to ascertain an expected value. The neural network can have multiple layers/nodes which are subsequently combined into an expected value of the sensor data. The individual layers or respectively nodes can be taken into account individually by means of weighting factors such that specific features or respectively characteristics of features can be given greater consideration in the expected value than others.

According to an embodiment of the invention, the method additionally involves the following steps:
- capturing, with the sensor arrangement, an input data record of temporally successive sensor data;
- supplying, in particular continually supplying during vehicle operation, the trained neural network with the input data record, wherein the expected sensor data are ascertained and/or predicted based on the input data record and the neural network trained with the learning data record.

"Supplying" can denote a feeding of the input data record to the neural network. Following the training of the neural network, the neural network can ascertain the expected sensor data, during operation, from the continually captured sensor data of the sensor arrangement, i.e. from the input data record. However, this is only possible if the neural network has previously been trained with the aid of a learning data record. The training can be effected, as described above, fully automatically and while the vehicle is travelling. The expected sensor data can be ascertained, produced and/or generated by the trained neural network and can be compared with the captured sensor data. The disparities between the ascertained expected sensor data and the sensor data which are actually currently captured can, in this way, be recognized quickly, simply and reliably with a high depth of detail.

According to an embodiment of the invention, a contamination and/or a measuring range restriction of the sensor arrangement is/are ascertained as a disparity by the comparison of the expected sensor data ascertained using the neural network with sensor data currently captured by the sensor arrangement. In other words, the disparity can be a contamination and/or a measuring range restriction such as e.g. a visibility restriction of a camera, a radar, ultrasonic, lidar, laser sensor element and/or any other sensor elements. The contamination and/or the measuring range restriction can be caused, for example, by dirt on the road, rain, leaves or by snow.

According to an embodiment, the sensor arrangement has at least one imaging sensor. Alternatively or additionally, the learning data record comprises and/or contains image data of at least one imaging sensor of the sensor arrangement.

The sensor arrangement can, in addition to many other sensors, also have an imaging sensor such as, in particular, one camera or multiple cameras, a radar sensor which captures a radar image and a laser sensor which captures a laser image. The captured sensor data are then image or respectively video data. Multiple cameras can also jointly provide sensor data, e.g. by a panorama image and/or by a surround view system. If cameras or respectively image data are used as the input data for the neural network, the neural network can ascertain an expected future image in a pixel-precise manner.

Within the framework of this application, an imaging sensor can be a camera, a radar sensor and/or a laser sensor.

According to an embodiment, the captured raw sensor data of the learning data record exclusively comprise image data of a flat road geometry, in particular a two-dimensional road geometry, wherein an elevated object relative to the predicted expected image data of the flat road geometry is ascertained as a disparity by comparing the expected image data of the at least one imaging sensor predicted using the neural network with image data currently captured by the sensor arrangement.

Alternatively or additionally to image data, any other sensor data of any other vehicle sensors such as, for example, radar data and/or laser data of a flat road geometry can also be used as the learning data record for the neural network.

By using exclusively "flat" road geometries during the training of the neural network, the system can ascertain the prediction of a "flat world sensor output" from the preceding sensor signals in each case. By comparing the flat world prediction with the sensor data actually captured, elevated objects such as e.g. other road users, road signs, boundary posts and/or bridges can be ascertained on the basis of their disparity from the expected or respectively predicted sensor data. In addition, by using flat image contents, the captured image data can be preselected and accordingly restricted such that individual regions of the captured image data do not have to be predicted. In particular, a road can, as a general rule, be recognized as a trapeze trapezium or trapezoid shape in a lower half of the image in the image data of the camera. It can therefore be envisaged that image data of a lower half of the image are simply predicted and compared with a lower half of the image of image data which have actually been captured. Consequently, the data quantity to be processed can be significantly reduced.

According to an embodiment, a reflection in an optical path of the camera is ascertained as a disparity by comparing the expected image data of the at least one imaging sensor, which is predicted using the neural network, with image data currently captured by the sensor arrangement. In other words, the disparity can be a reflection in the optical path of the camera, which is contained in the captured sensor data of the camera. The reflection can be caused, for example, by a pane in front of the camera, water in front of the lens of the camera or mirages. Similarly, alterations in the optical path (contamination, reflection or the like) can therefore also be recognized in the case of radar sensors, laser sensors and/or ultrasonic sensors.

According to an embodiment, the sensor arrangement has a first sensor element and a second sensor element, wherein the method further involves the following steps:
  capturing, with the first sensor element, an input data record of temporally successive first sensor data;
  supplying the trained neural network with the input data record;
  ascertaining and/or predicting expected second sensor data of the second sensor element based on the input data record of the captured sensor data of the first sensor element.

It is therefore envisaged according to the invention that the neural network can be trained in such a way that expected sensor data of a second sensor element are ascertained on the basis of the sensor data of a first sensor element and the neural network. In other words, the neural network can be trained for a correlation between two sensor elements of the sensor arrangement. The trained neural network can subsequently be supplied with sensor data of one of the sensor elements and ascertain expected sensor data of the other sensor element. For example, expected sensor data of a radar sensor can be ascertained by the neural network on the basis of captured sensor data of a camera.

According to an embodiment, the first sensor element and the second sensor element are in each case at least one element selected from the group consisting of a camera, a radar sensor, a lidar sensor, an ultrasonic sensor, a laser sensor, a rotation rate sensor, a speed sensor, a rain sensor, a pressure sensor and a gyro sensor.

The method according to the invention can consequently be deployed for any sensor elements and the associated sensor data.

According to another embodiment, the method additionally involves a step of ascertaining calibration values and/or installation parameter values of the second sensor element based on the first sensor data captured with the first sensor element. Additionally, the calibration of the second sensor element can be performed on ascertained calibration values or respectively installation parameter values.

The application of the method can additionally make it possible to ascertain online calibration values and is also suitable for learning the rotation rate, the vehicle's ego movement or the camera installation angle (vanishing point geometry). The expected sensor data of a first sensor element can be predicted on the basis of its calibration data and the sensor data of a second sensor element, with the indicated method. By means of a subsequent comparison with the sensor data of the first sensor element which have actually been captured, and a variation of the calibration data, the best/most likely installation calibration of the first sensor element can be ascertained.

A further aspect of the invention relates to a driver assistance system. The driver assistance system has a sensor arrangement for capturing sensor data and a controller having a neural network implemented therein, wherein the controller and/or the driver assistance system is designed and set up to perform the method which is described above and below.

A further aspect of this invention relates to a vehicle having a driver assistance system which is described above and below.

The vehicle can be, for example, a motor vehicle such as a car, a motorcycle, a bus or a truck, or an aircraft, a helicopter or a ship.

A further aspect of the invention relates to a programming element, which, if it is run on a controller of a driver assistance system, instructs the driver assistance system to perform the method which is described in the context of the invention.

A further aspect of the present invention relates to a computer-readable medium, including a tangible, non-transitory or non-transient, computer-readable medium, on which such a programming element is stored.

Advantages of the invention are summarized below. The invention advantageously makes it possible to recognize and/or segment objects in a pixel-precise manner without explicit knowledge of the respective object class thereof. In addition, no manual labeling of the training data is required. A prediction and a comparison of different sensor data are possible. Reflections can also be recognized in sensor data. The prediction of vehicle signals and installation parameters of sensor elements is made possible, and the ascertaining of online calibration values and installation calibrations between different vehicle sensors should be indicated as further advantages of the invention. Automatic training can additionally be made possible during driving.

BRIEF DESCRIPTION OF THE DRAWINGS

Further features, advantages and possible applications of the invention are set out in the following description of the exemplary embodiments and figures. The figures are schematic and not true to scale. If the same reference numerals are indicated in the following description in various figures, these denote the same, similarly acting or similar elements.

DETAILED DESCRIPTION OF EXAMPLE EMBODIMENTS OF THE INVENTION

Figure 1:
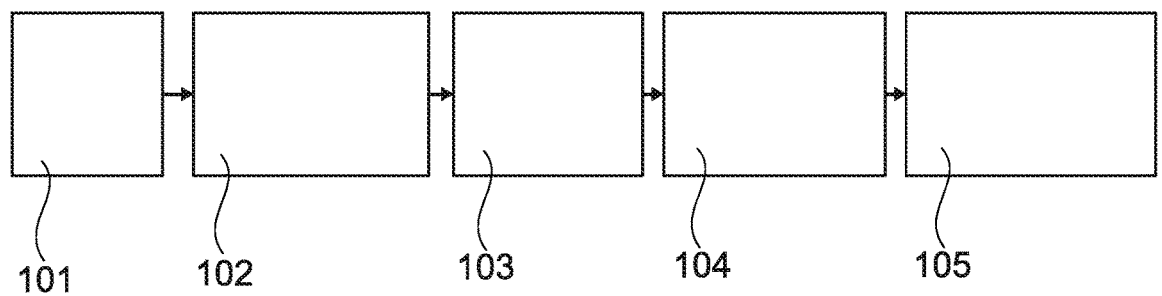
FIG. 1 shows a flow chart in order to illustrate steps of the method for ascertaining disparities in sensor data with the aid of a trained neural network according to an embodiment of the invention.
Figure 2:
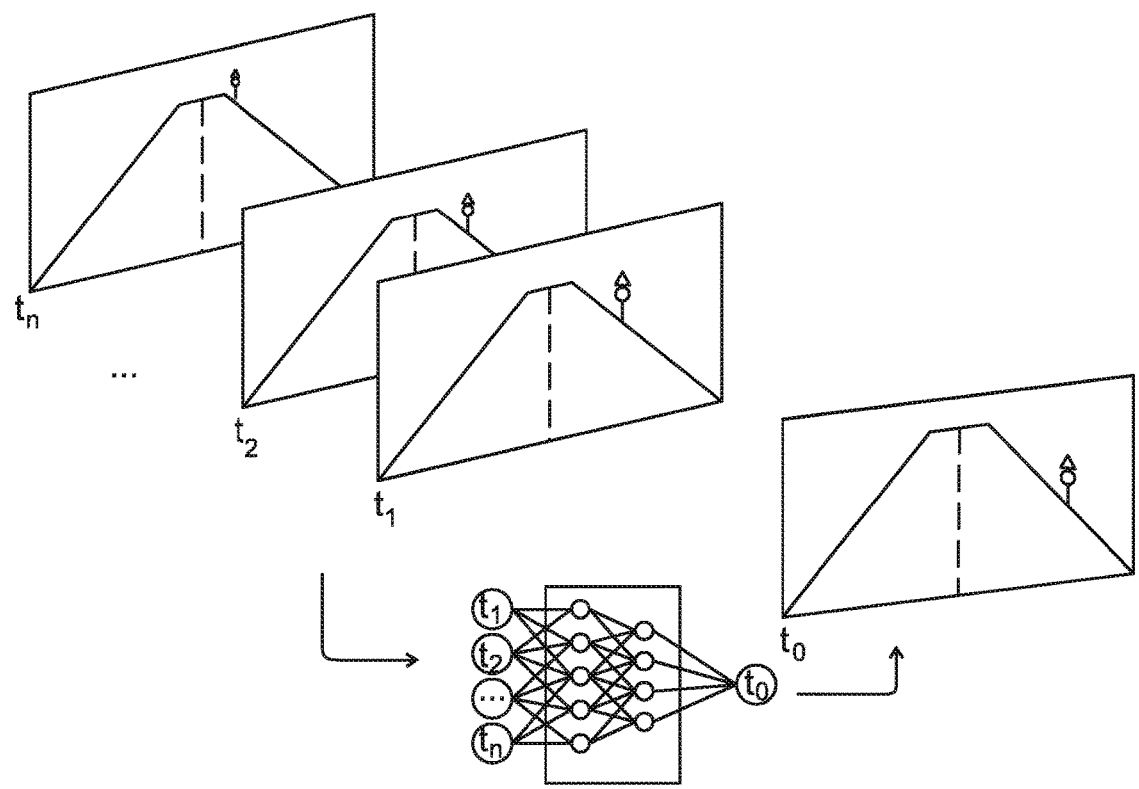
FIG. 2 shows a schematic representation of the operating principle of the training of the neural network according to an embodiment of the invention.
Figure 3:
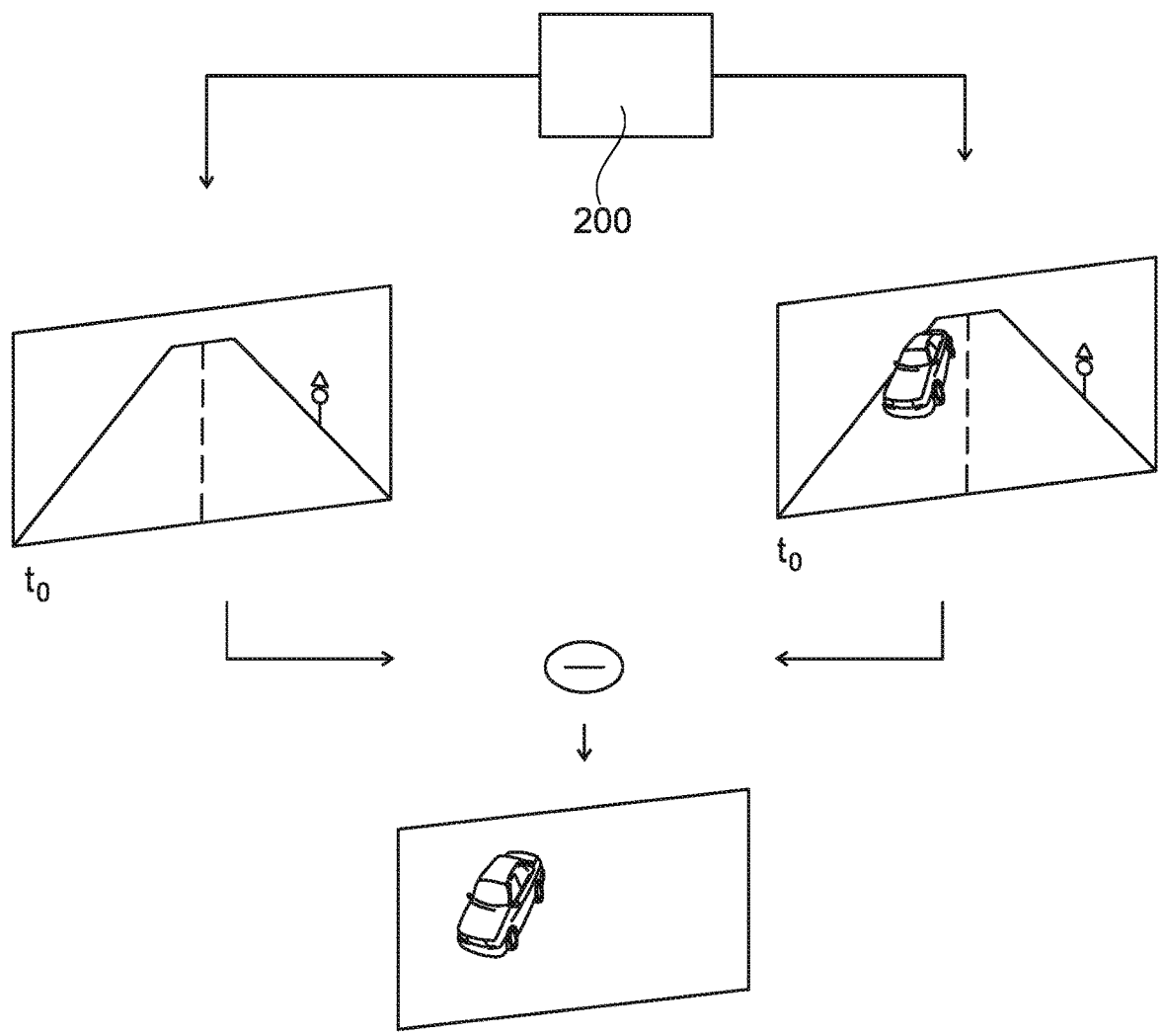
FIG. 3 shows a schematic representation of the comparison of the expected sensor data with the captured sensor data according to an embodiment of the invention.

FIG. 1 shows a flow chart in order to illustrate steps of the method for ascertaining disparities in sensor data with the aid of a neural network. The method is explained in greater detail below by means of FIGS. 2 and 3. FIG. 2 shows a schematic representation of the operating principle of the training of the neural network according to an embodiment of the invention. FIG. 3 further shows a schematic representation of the comparison of the expected sensor data with the captured sensor data according to an embodiment of the invention.

In a first step 101, temporally successive raw sensor data (t1, t2, t3, ..., tn) are captured by means of the sensor arrangement and/or at least one sensor element of the sensor arrangement. These raw sensor data serve to train a neural network in step 102, wherein the learning data record for training the neural network is evaluated and/or processed by the neural network. Expected sensor data are ascertained in step 103. Said expected sensor data can be ascertained in order to train the neural network purely based on the learning data record. Following the training of the neural network, expected sensor data can, however, also be ascertained in step 103 based on the trained neural network and based on an input data record from temporally successive sensor data.

More precisely, during the training phase of training the neural network, the expected sensor data (t0) at a specific time t0 based on the temporally previous raw sensor data is compared with the currently captured sensor data (t0), as illustrated in step 104. During the training phase, this comparison serves to further improve the neural network or respectively to be able to better classify features in the sensor data.

During operation, sensor data can then be continuously captured by the sensor arrangement. The trained neural network can then be supplied with the captured sensor data, wherein the neural network can ascertain expected sensor data. The expected sensor data can subsequently be compared with the temporally corresponding captured sensor data. This comparison can advantageously be executed by a control unit of the driver assistance system. For example, the comparison can be effected by subtracting the ascertained expected sensor data and the currently captured sensor data. Based on the comparison, a disparity between the expected and the currently captured sensor data can then be ascertained in step 105. Such a disparity can then, for example, be assigned to another road user, another vehicle, a reflection in an optical path of the camera, a road sign, a bridge, a reflection, a contamination, a calibration disparity or any other event.

The neural network can also be trained for a correlation between two different sensor elements such that the captured sensor data of a sensor element can be utilized in order to determine the expected sensor data of another sensor element.

Figure 4:
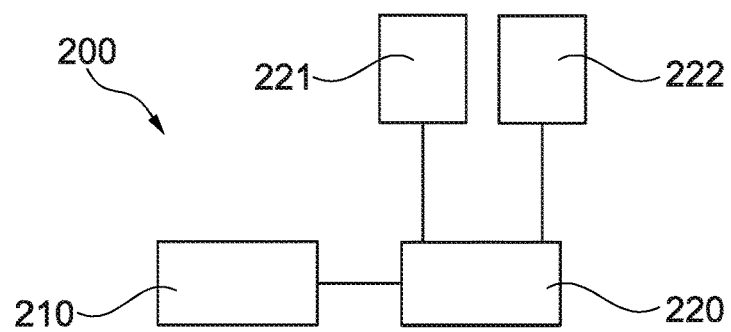
FIG. 4 shows a schematic representation of a driver assistance system for ascertaining disparities in sensor data according to an embodiment of the invention.

FIG. 4 shows a driver assistance system 200. The driver assistance system 200 has a control unit 210 and a sensor arrangement 220. The sensor arrangement 220 can, in turn, have one or more sensor elements 221, 222. Only two sensor elements are represented in FIG. 4 for simplification reasons, however the sensor arrangement 220 can also have more than two sensor elements 221, 222. The individual sensor elements 221, 222 are designed to capture sensor data. The sensor elements 221, 222 can additionally be designed to continually capture temporally successive sensor data. The captured sensor data are forwarded by the sensor arrangement 220 to the control unit 210 and are evaluated there. A neural network is additionally implemented in the control unit 210. The neural network is trained with the aid of the captured sensor data and is able to ascertain expected sensor data for a future time from captured sensor data. In addition, the control unit 210 is designed to compare the expected sensor data with the captured sensor data at the corresponding time.

The comparison can be effected, for example, by subtracting the two data records. Disparities between the captured sensor data and the expected sensor data can be established by the comparison. The control unit 210 can analyze and evaluate or respectively assess these ascertained disparities. The result of the evaluation of the comparison can subsequently be notified by the control unit 210 of the driver assistance system 200 to the driver of the vehicle.

The invention claimed is:

1. A method of ascertaining disparities in sensor data using a neural network implemented in a controller of a vehicle, the method comprising the following steps:

with a sensor arrangement of the vehicle, capturing a learning data record of temporally successive raw sensor data;

using the neural network, evaluating the learning data record to train the neural network based on the learning data record of the captured raw sensor data;

with the sensor arrangement, capturing an input data record of temporally successive sensor data;

supplying the input data record into the trained neural network;

using the trained neural network, ascertaining expected sensor data based on the input data record that is supplied into the trained neural network;

with the sensor arrangement, capturing current sensor data;

comparing the expected sensor data with the current sensor data;

ascertaining a disparity between the current sensor data and the expected sensor data; and producing a result in response to and dependent on the disparity.

2. The method according to claim 1,
wherein a contamination and/or a measuring range restriction of the sensor arrangement is/are determined as the result.

3. The method according to claim 1,
wherein the sensor arrangement comprises an imaging sensor; and
wherein the raw sensor data of the learning data record comprise image data.

4. The method according to claim 3,
wherein the image data of the raw sensor data of the learning data record comprise image data of a flat road geometry; and
wherein an object which is elevated relative to the expected image data is detected as the result.

5. The method according to claim 3,
wherein a reflection in an optical path of the imaging sensor is detected as the result.

6. The method according to claim 1,
wherein the sensor arrangement comprises a first sensor element and a second sensor element,
wherein the input data record is captured with the first sensor element,
wherein the expected sensor data is data expected from the second sensor element, and
wherein the current sensor data is captured with the second sensor element.

7. The method according to claim 6,
wherein the first sensor element and the second sensor element each respectively comprise an element selected from the group consisting of a camera, a radar sensor, a lidar sensor, an ultrasonic sensor, a laser sensor, a rotation rate sensor, a speed sensor, a rain sensor, a pressure sensor and a gyro sensor.

8. The method according to claim 6,
wherein calibration values and/or installation parameter values of the second sensor element are determined as the result.

9. A driver assistance system for performing the method according to claim 1, wherein the driver assistance system comprises:
the sensor arrangement configured to capture the raw sensor data and the current sensor data, and
the controller having the neural network implemented therein, wherein the controller is configured to perform the method.

10. The method according to claim 1, wherein the neural network is trained exclusively based on the learning data record of the captured raw sensor data.

11. The method according to claim 1, expressly excluding training of the neural network based on manually labeled training data.

12. The method according to claim 1, wherein the evaluating of the learning data record comprises evaluating successive changes in previous successive items of the raw sensor data relative to one another, from the successive changes predicting a next change to produce a predicted current item of the raw sensor data, comparing the predicted current item of the raw sensor data to an actual current item of the raw sensor data, and updating parameters of the neural network based on any difference between the predicted current item and the actual current item of the raw sensor data.

13. A method of training and using a neural network in a controller of a vehicle, comprising training steps:
   a) with a sensor arrangement of the vehicle, capturing a training data set comprising successive previous training data items and a current training data item;
   b) supplying the previous training data items into the neural network, to produce a current expected data item at an output of the neural network;
   c) comparing the current expected data item with the current training data item, determining a discrepancy therebetween, and updating parameters of the neural network in response to and dependent on the determined discrepancy; and
   d) repeating the training steps a) to c) through plural cycles so as to reduce the discrepancy determined in the step c) in a subsequent one of the cycles; and
   after the training steps, further comprising operating steps:
   e) with the sensor arrangement, capturing an operating data set comprising successive previous operating data items and a current operating data item;
   f) supplying the previous operating data items into the neural network, to produce a current predicted data item at the output of the neural network;
   g) comparing the current predicted data item with the current operating data item, and determining a disparity therebetween; and
   h) producing a result in response to and dependent on the disparity.

14. The method according to claim 13, wherein the neural network is trained exclusively by performing the training steps based on the training data sets in the plural cycles.

15. The method according to claim 13, expressly excluding training of the neural network based on manually labeled training data.

* * * * *